(12) United States Patent
Zhou et al.

(10) Patent No.: US 7,231,600 B2
(45) Date of Patent: Jun. 12, 2007

(54) FILE TRANSLATION

(75) Inventors: Sean Zhou, Scarborough (CA); Emad Muhanna, Toronto (CA); Song Guan, Beijing (CN); Mikito Hirota, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 478 days.

(21) Appl. No.: 10/782,501

(22) Filed: Feb. 19, 2004

(65) Prior Publication Data

US 2004/0267803 A1   Dec. 30, 2004

(30) Foreign Application Priority Data

Jun. 26, 2003   (CA) ................... 2433512

(51) Int. Cl.
G06F 15/00 (2006.01)
(52) U.S. Cl. ............... 715/536; 707/102; 707/536; 707/100; 707/104.1; 704/1; 704/2
(58) Field of Classification Search ............ None
See application file for complete search history.

(56) References Cited

U.S. PATENT DOCUMENTS

| | | | |
|---|---|---|---|
| 6,091,897 A | 7/2000 | Yates et al. ............... 717/138 |
| 6,092,037 A | 7/2000 | Stone et al. ............... 704/8 |
| 6,286,131 B1 | 9/2001 | Beers et al. ............... 717/125 |
| 6,425,123 B1 | 7/2002 | Rojas et al. ............... 717/136 |
| 2003/0014237 A1* | 1/2003 | Macklin ............... 704/2 |
| 2003/0033584 A1 | 2/2003 | Reyna et al. ............... 717/109 |
| 2004/0168132 A1* | 8/2004 | Travieso et al. ............... 715/536 |

OTHER PUBLICATIONS

IBM TDB; "Maintain Design and Program Source Together as One Entity", vol. 38, No. 03, Mar. 1995.
Sourrouille, JL. et al.; "Constraint Checking in UML Modeling", Jul. 15-19, 2002.
Sheridan, P. et al.; "Cross-Language Speech Retrieval: Establishing a Baseline Performance", 1997.
Quinn, MJ. et al.; "Compiling C* Programs for a Hypercube Multicomputer", 1998.

* cited by examiner

Primary Examiner—Alford Kindred
Assistant Examiner—Belix M. Ortiz
(74) Attorney, Agent, or Firm—Duke W. Yee; Herman Rodriguez; Peter B. Manzo

(57) ABSTRACT

A solution for translating translatable components in a file containing structured information from a source language to one or more selected destination languages is disclosed. In an embodiment, the translatable components in the original file may be identified by an identifier. Such an identifier may be, for example, a prefix character string, which may be located using a suitable parser. The file and its translatable components may then be separated into a structural base or "skeleton" file, and an "isolated" file containing the translatable components. The translatable components in the isolated file may then be translated from the source language to a selected destination language to form translated components. These translated components in the isolated file may then be merged with the skeletal file to create a new file having substantially the same structure as the original file, but with the translatable components translated into the selected destination language.

22 Claims, 5 Drawing Sheets

```
                                                           ,-310
    ...
310a─► <UserGroups>
310b─►    <UserGroup Name="Employees" OwnerID="RootOrganization" Description="Employees"
310c─►  MemberGroupID="-161" LanguageID="&en_US;">
310d─►       <UserCondition>Users with role of customer service representative</UserCondition>
310e─►    <UserGroup>
          ...
310f─► <UserGroups>
   ...
```

```
                                       ,-320
    ...
320a─► <xsd:complexTypename="UserGroup">
320b─►    <xsd:sequence>
320c─►       <xsd:element name="UserCondition" type="translatable"/>
320d─►    <xsd:sequence>
320e─►    <xsd:attribute name="Name" type="xsd:integer"/>
320f─►    <xsd:attribute name="OwnerID" type="xsd:integer"/>
320g─►    <xsd:attribute name="Description" type="translatable"/>
320h─►    <xsd:attribute name="MemberGroupID" type="xsd:integer"/>
320i─►    <xsd:attribute name="LanguageID" type="language_identifier"/>
320j─► </xsd:complexType>
   ...
```

```
    <UserGroups>
310a →      <UserGroup Name="Employees" OwnerID="RootOrganization" Description="Employees"
310b →
310c → MemberGroupID="-161" LanguageID="&en_US;">
310d →          <UserCondition>Users with role of customer service representative</UserCondition>
310e →      <UserGroup>
    ...
310f →  <UserGroups>
    ...
```

FIG. 3A

```
    ...
320a → <xsd:complexTypename="UserGroup">
320b →      <xsd:sequence>
320c →          <xsd:element name="UserCondition" type="translatable"/>
320d →      </xsd:sequence>
320e →      <xsd:attribute name="Name" type="xsd:integer"/>
320f →      <xsd:attribute name="OwnerID" type="xsd:integer"/>
320g →      <xsd:attribute name="Description" type="translatable"/>
320h →      <xsd:attribute name="MemberGroupID" type="xsd:integer"/>
320i →      <xsd:attribute name="LanguageID" type="language_identifier"/>
320j → </xsd:complexType>
    ...
```

FIG. 3B

FILE TRANSLATION

BACKGROUND OF THE INVENTION

The present invention relates generally to computer systems, and more specifically to translation of files containing structured information and translatable components.

One type of file containing structured information is known as an Extensible Markup Language ("XML") file. As known to those skilled in the art, XML is a meta-language for documents. XML provides a way of defining structured information containing content, such as text and graphics, and an indication of how such content may be used. Due to its inherent flexibility, XML may be used to describe structures for a wide range of data types. XML files have thus become a widely adopted format for exchanging various types of data for example on the Internet.

An XML file may often include translatable components (i.e. elements or attributes) in the structured information, typically in one source language. With the global reach of the Internet, it is often desirable to have the translatable components in an XML file translated from the source language to one of a number of selected destination languages. A difficulty with translating XML files is that, due to their inherent flexibility, one XML file may have a structure, which is quite different from that of another XML file. Consequently, it may be difficult to identify translatable components in an XML document, and the results of a translation may not be satisfactory.

What is needed is a design for translating files containing structured information and translatable components, which at least partially addresses the difficulty described above.

SUMMARY OF THE INVENTION

The present invention provides a solution for translating translatable components in a file containing structured information from a source language to one or more selected destination languages.

In an embodiment, the translatable components in the original file may be identified by an identifier. Such an identifier may be, for example, a prefix character string, which may be located using a suitable parser. The file and its translatable components may then be separated into a structural base or "skeleton" file, and an "isolated" file containing the translatable components. The translatable components in the isolated file may then be translated from the source language to a selected destination language to form translated components. These translated components in the isolated file may then be merged with the skeletal file to create a new file having substantially the same structure as the original file, but with the translatable components translated into the selected destination language.

In an embodiment, the file containing structured information is an XML file, and the translatable components are translatable element and attribute values in the XML file.

In another embodiment, an XML schema definition file may be created to describe the structure of the original XML file. A suitable parser may then parse the original XML file and use the XML schema definition file to identify all of the translatable "types" of elements and attributes in the original XML file. Upon such identification, values or character strings assigned to the translatable elements and attributes may be translated from the source language to a selected destination language. In an embodiment, the values of the translatable elements and attributes may be overwritten in situ in the XML file by a corresponding value translated into a selected destination language.

Advantageously, a file containing structured information and translatable components, such as an XML file, may be more readily translated from a source language to a selected destination language, with a reduced probability of errors caused by attempting to translate non-translatable parts of a file.

In an aspect of invention, there is provided a method of translating translatable components in a structured file, comprising:
(i) parsing said structured file to identify said translatable components and a source language;
(ii) effecting translation of said identified translatable components from said source language to a selected destination language so as to generate corresponding translated components;
(iii) generating a new translated file having substantially the same structure as said structured file and having said translated components in place of said translatable components.

In another aspect of the invention, there is provided a system for translating translatable components in a structured file, comprising:
(a) a parser for parsing said structured file to identify said translatable components and a source language;
(b) an interface to a translator for translation of said identified translatable components from said source language to a selected destination language to generate corresponding translated components;
(c) an output module for generating a new translated file having substantially the same structure as said structured file and having said translated components in place of said translatable components.

In another aspect of the invention, there is provided a computer readable medium for translating translatable components in a structured file, the computer readable medium comprising:
(i) code for parsing said structured file to identify said translatable components and a source language;
(ii) code for effecting translation of said identified translatable components from said source language to a selected destination language so as to generate corresponding translated components;
(iii) code for generating a new translated file having substantially the same structure as said structured file and having said translated components in place of said translatable components In another aspect of the invention, there is provided a system for translating components in a structured file, comprising:
(a) means for parsing said structured file to identify said translatable components and a source language;
(b) means for interfacing to a translator for translation of said identified translatable components from said source language to a selected destination language to generate corresponding translated components;
(c) means for generating a new translated file having substantially the same structure as said structured file and having said translated components in place of said translatable components.

The foregoing and other aspects of the invention will be apparent from the following more particular descriptions of exemplary embodiments of the invention.

BRIEF DESCRIPTION OF THE DRAWINGS

In the figures which illustrate exemplary embodiments of the invention:

FIG. 3A is a schematic diagram of an illustrative XML file containing translatable elements and attributes.

FIG. 3B is an illustrative XML schema definition file corresponding to the XML file of FIG. 3A.

DETAILED DESCRIPTION OF EXEMPLARY EMBODIMENTS

Figure 1:
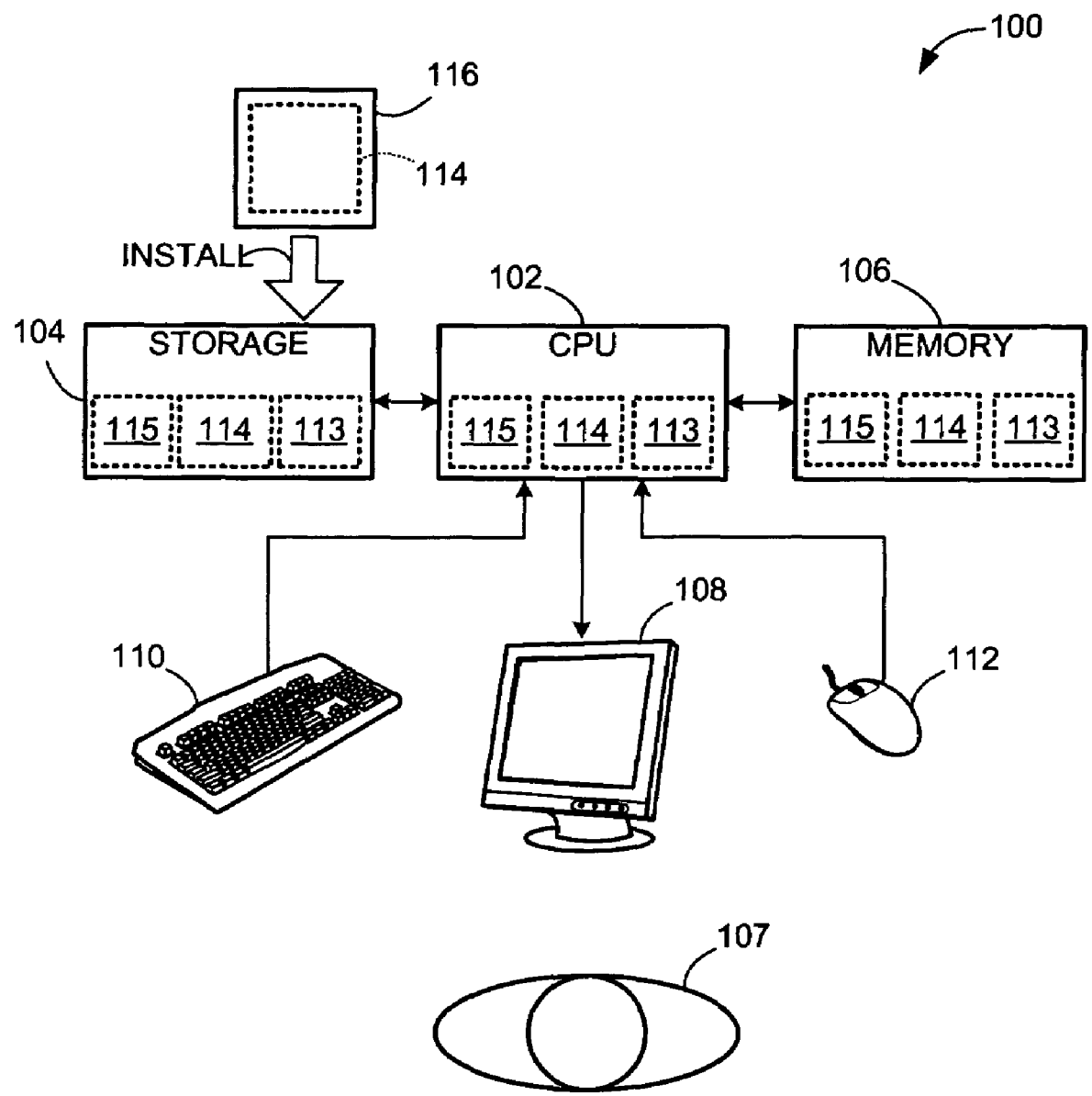
FIG. 1 is a schematic block diagram of a generic data processing system, which may provide an operating environment for exemplary embodiments of the invention.

Referring to FIG. 1, shown is an illustrative data processing system 100 that may provide an operating environment for exemplary embodiments of the invention. The data processing system 100 may include a central processing unit ("CPU") 102 operatively connected to a storage unit 104 and to a random access memory ("RAM") 106. A user 107 may interact with the data processing system 100 using a video display 108, and various inputs such as a keyboard 110 and mouse 112. The data processing system 100 of FIG. 1 is illustrative and not meant to be limiting in terms of the type of data processing system that may provide a suitable operating environment for exemplary embodiments of the invention.

In the illustrative data processing system 100, a file 113 may be stored on storage 104. For example, the file 113 may be an XML file containing structured information and translatable components, such as translatable elements and attributes. When accessed, the XML file 113 may be stored in RAM 106 and processed by CPU 102.

In the illustrative data processing system 100, a software program 114 stored on a computer readable medium 116 may be copied onto storage 104, loaded into RAM 106, and processed by CPU 102. For example, the software program 114 may embody a method in accordance with an exemplary embodiment, as described further below. In an embodiment, the software program 114 may create one or more files, as generically indicated at 115. For example, the file or files 115 may relate to the XML file 113 and may be created as a result of parsing or translating the XML file 113, as discussed further below. The file or files 115 may also be temporarily loaded into RAM 106 and processed by CPU 102, as the case may be.

Figure 2A:
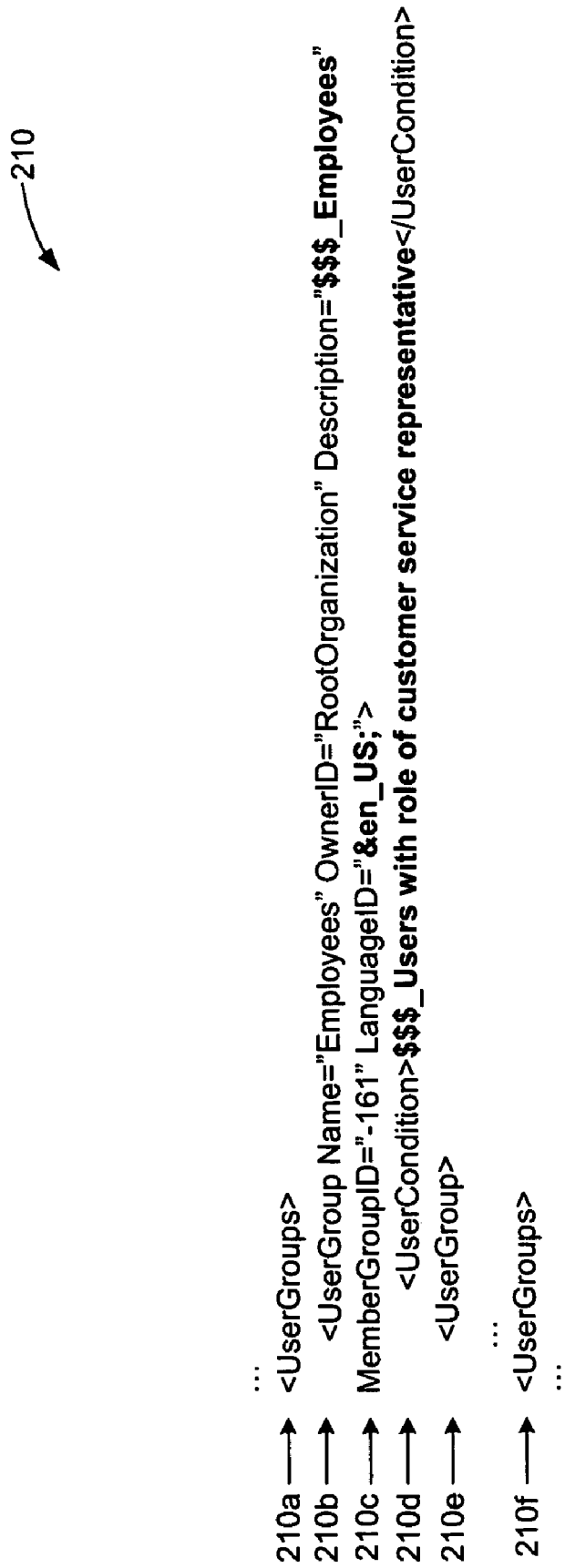
FIG. 2A is a schematic diagram of an illustrative XML file containing identified translatable elements and attributes.

Referring to FIG. 2A, shown is an example of a portion of an XML file 210 containing translatable components, such as translatable element and attribute values. As shown at line 210a and 210f, this portion of the XML file 210 is labeled as "UserGroups". At line 210b, the attribute "Description" is assigned the value "$$$_Employees". At line 210c, the attribute "Language ID" is assigned the value "&en_US;" to indicate "U.S. English". This is the "source" language of the XML file 210 in the context of the present discussion. At line 210d, the element "UserCondition" is assigned the value "$$$_Users with the role of customer service representative". In FIG. 2A, these values are shown in boldface for the purpose of illustration.

In an embodiment, the translatable components of the XML file 210 may be labeled by an identifier. For example, as shown in FIG. 2A an identifier in the form of a character string "$$$_" may be used as a prefix to label the translatable values at lines 210b and 210d.

Figure 2B:
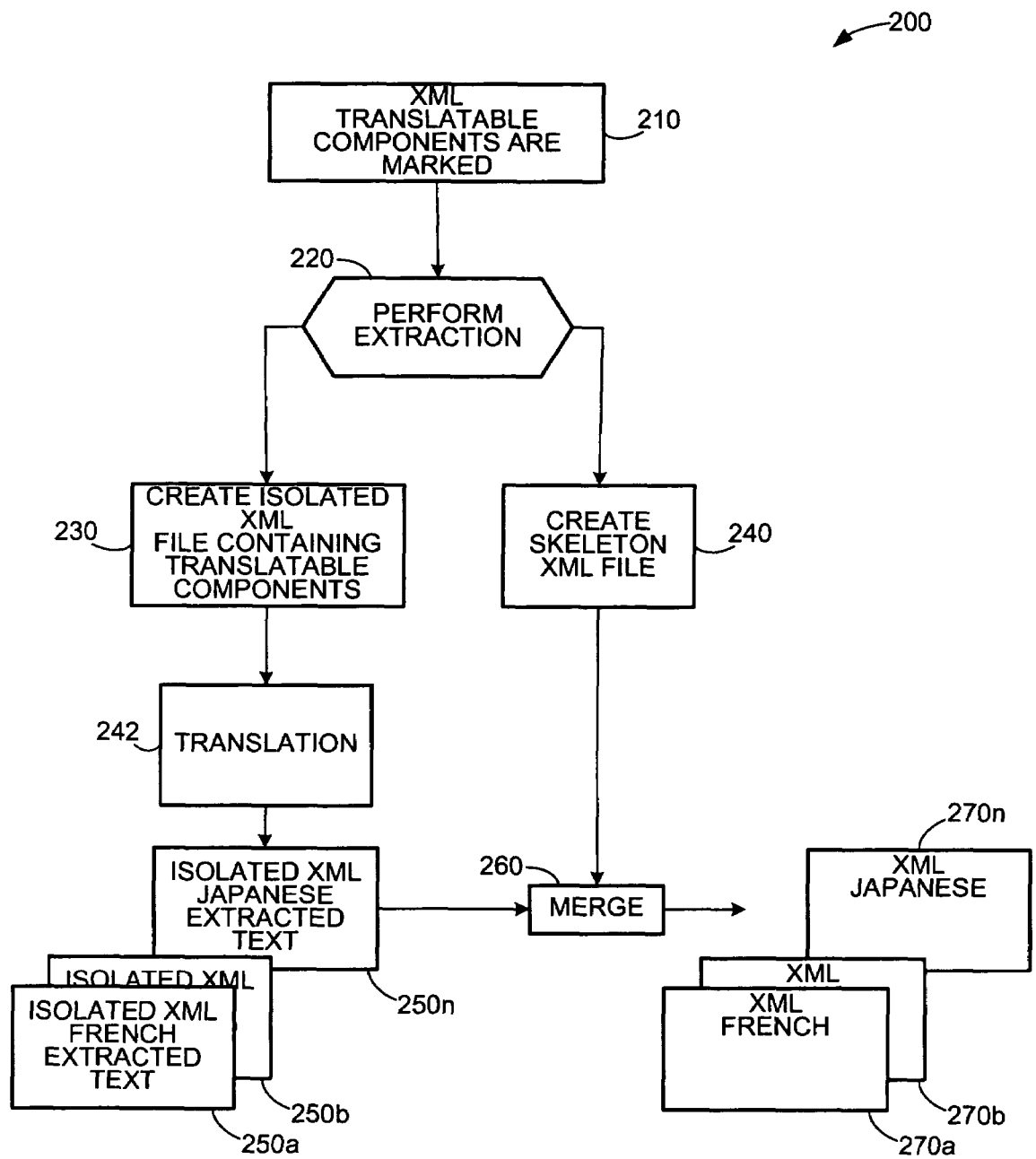
FIG. 2B is a schematic flowchart of a method in accordance with an exemplary embodiment.

Now referring to FIG. 2B, shown is a translation method 200 in accordance with an exemplary embodiment. This method 200 may be embodied as a software program (such as the software program 114 of FIG. 1) for execution on a data processing system (such as the data processing system 100 of FIG. 1).

As shown, translatable components in the XML file 210 may undergo extraction at block 220. In an embodiment, the extraction method 220 may read the original XML file 210 to identify the translatable components. In the present example, a parser may be used to locate and identify occurrences of the prefix "$$$_" in the XML file 210. In an embodiment, a "Simple API for XML" or "SAX" parser may be used. If the prefix "$$$_" is present, then the attached value inside the quotation marks is assumed to be translatable and placed in an isolated XML file at block 230. Otherwise, the component of the XML file is assumed to be non-translatable file structure, and may be placed in a "skeleton" XML file at block 240.

In an embodiment, the isolated XML file may be configured to always have a standard file structure. This standard file structure of the isolated XML file is known by or communicated to a translator, such that translation of the extracted translatable components in the isolated XML file is straightforward.

Furthermore, as an attribute description in an XML file may be extracted to the isolated XML file as simply text, the attribute description is significantly easier to translate.

In an embodiment, a serial number (not shown) may be associated with each translatable value extracted at block 220 from the original XML file. When a translatable value is extracted, the associated serial number may be used as a "placeholder" in the skeleton XML file such that the translated value may be subsequently returned to its proper location. For this purpose, the serial number may also be stored with each translatable component in the isolated XML file at block 230.

The isolated XML file may then undergo translation at block 242 to a selected destination language. For the purpose of this translation, the assigned value of "&en_US;" of the "Language ID" attribute at line 210c may be passed on to block 242 along with the isolated XML file.

The translation at block 242 may then translate the translatable components in the isolated XML file and create one of a number of translated, isolated XML files 250a–250n in one of a number of selected destination languages. The translation at block 242 may be performed by any one of a number of translators. For example, the translation may be performed by a software program, which attempts to simulate human translation, or more simply attempts pseudo-translation using equivalent words in a dictionary. Alternatively, the translatable components in the isolated XML file may be translated by a human translator (e.g. the user 107 of FIG. 1). It will also be appreciated that the isolated XML file may be temporarily removed from the data processing system 100, translated elsewhere, and then returned to the data processing system 100. In each case, a translated, isolated XML file 250a–250n is created. Any one of these translated isolated XML files 250a–250n may then be merged with the skeleton XML file at block 260.

The merging at block 260 may create one of a number of new XML files 270a–270n, which represent translated destination language equivalents to the original XML file 210. That is to say, the skeletal structure of the new XML files 270a–270n will be substantially identical to that of the original XML file 210, but the translatable components will have been translated into the selected destination language. During this merging procedure, each translated component may be returned to its proper location in the new XML files 270a–270n, for example by matching its serial number with that of a placeholder in the skeleton XML file 240.

The translatable components in the merged files 270a–270n need not contain the prefix "$$$_". This is because the original file 210 will typically be available as a source for translation, and attempting to translate a translated version may result in more translation errors than if the original file 210 is always used as the translation source.

In an embodiment, a new language identifier corresponding to the translated language may replace the original language identifier on line 210c of the original XML file 210. For example, if translated to Spanish, the string "&es_ES;" may replace the original string "&en_US;".

The exemplary method 200 shown in FIG. 2B first identifies and extracts the translatable components contained in the XML file 210, before translation of the translatable components takes place. This placement of the translatable components into an isolated file allows translation to proceed with a substantially reduced likelihood of errors arising from attempted translation of non-translatable parts of the original XML file 210.

Now referring to FIG. 3A, shown is another example of a portion of an XML file 310. As shown at lines 310a and 310f, this portion of the XML file 310 is labeled as "User-Groups". Within this portion of the XML file 310, certain elements and attributes are defined. For example, at line 310b, the attribute "Name" is assigned the value of "Employees". At line 310c, the attribute "Language ID" is assigned the value of "&en_US;" to indicate "US English". At line 310d, the element "UserCondition" is assigned the value "Users with role of customer service representative". In FIG. 3A, these assigned values are shown in boldface for the purpose of illustration.

Referring to FIG. 3B, shown is an illustrative example of an XML schema definition file 320 associated with the portion of the XML file 310 of FIG. 3A. In this example, the XML schema definition file 320 includes lines 320a–320j providing a complete structural description of the portion of the XML file 310. The XML schema definition file 320 further provides information identifying the translatable elements and attributes in the XML file 310. For example, at line 320c, the element "UserCondition" is identified as being a "translatable" type. Also, at line 320g the attribute "Description" is identified as being a "translatable" type. At line 320i, the attribute "LanguageID" is identified as being a "language_identifier" type.

Figure 3C:
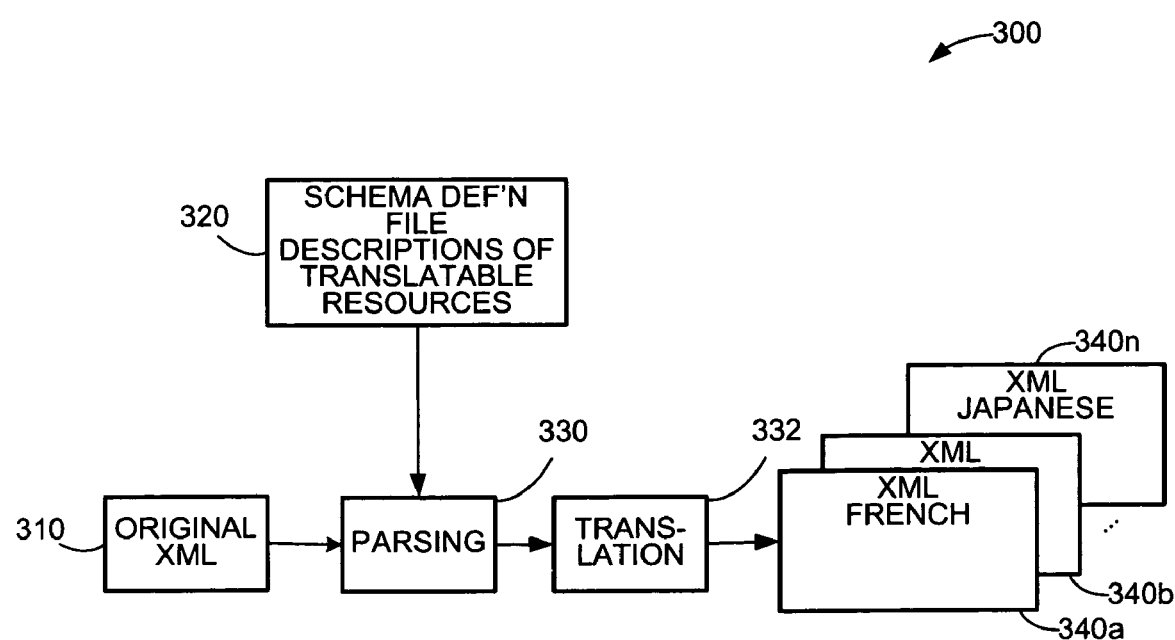
FIG. 3C is a schematic flowchart of a method in accordance with another exemplary embodiment.

Now referring to FIG. 3C, in an embodiment, the original XML file 310 of FIG. 3A and the XML schema definition file 320 of FIG. 3B may both be used as inputs at block 330 to parse the translatable elements and attributes in XML file 310. More specifically, the XML schema definition file 320 of FIG. 3B may be used by a parser to identify in the XML file 310 the elements and attributes which are "translatable". In an embodiment, a "Document Object Model" or "DOM" parser may be used to parse both the XML file 310 and the XML schema definition file 320. As will be appreciated by those skilled in the art, a tree structure formed by the DOM parser from the schema definition file 320 may be used to identify the "translatable" types of elements and attributes. Upon identification, each "translatable" type of element or attribute may be translated in situ from the source language "&en_US;" to a selected destination language.

As shown in FIG. 3C, after undergoing the parsing procedure at block 330, the translatable elements may be translated at block 332. As at block 242 of FIG. 2B, the translation may be effected by any one of a number of translators, including translation by a software program, and translation by a human translator.

The translated XML file may then be saved as one of a number of new XML files 340a–340n incorporating the translated elements and attributes. The source language identifier "&en_US;" provided in the XML file 310 may also be overwritten by the new destination language identifier corresponding to the selected destination language. For example, the selected destination language may be Spanish, with the identifier "&es_ES;".

While exemplary embodiments have been described above, it will be apparent to those skilled in the art that various changes and modifications may be made.

For example, while a prefix character string has been described as a possible identifier for translatable components, it will be appreciated that any other type of suitable identifier recognized by a software program may also be used.

Therefore, the scope of the invention is limited only by the language of the following claims.

The embodiments of the invention in which an exclusive property or privilege is claimed are defined as follows:

1. A method of translating translatable components in a structured file, comprising the steps of:
   (i) parsing said structured file to identify said translatable components and a source language, wherein said structured file includes an identifier prior to said parsing, and wherein said identifier identifies each of said translatable components;
   (ii) effecting translation of said identified translatable components from said source language to a selected destination language so as to generate corresponding translated components; and
   (iii) generating a new translated file having substantially the same structure as said structured file and having said translated components in place of said translatable components.

2. The method of claim 1, wherein said identifier is a prefix, and wherein said prefix is a character string.

3. The method of claim 2, wherein (i) further comprises identification of said prefix using a parser.

4. The method of claim 1, further comprising extracting said identified translatable components into an isolated file for effecting translation in (ii) of said translatable components to said translated components.

5. The method of claim 4, wherein said structured file, after extraction of said identified translatable components, comprises a skeleton file.

6. The method of claim 5, wherein (iii) further comprises merging said skeleton file and said translated components in said isolated file.

7. The method of claim 6, wherein said structured file is an XML file, and said translatable components comprise translatable element and attribute values.

8. The method of claim 1, wherein (i) further comprises utilizing a structure definition file corresponding to said structured file to identify said translatable components, said structure definition file containing identification information for said translatable components in said structured file.

9. The method of claim 8, wherein (ii) further comprises translating said translatable components in situ and (iii)

further comprises replacing said translatable components with said corresponding translated components.

10. The method of claim 9, wherein said structured file is an XML file and said structure definition file is an XML schema definition file identifying translatable elements and attributes in said XML file.

11. The method of claim 1, wherein a serial number is associated with each of said translatable components, and wherein said serial number is used as a placeholder to place each of said translated components in a proper location within said new translated file.

12. A system for translating translatable components in a structured file, comprising:
  (a) a parser for parsing said structured file to identify said translatable components and a source language, wherein said structured file includes an identifier prior to said parsing, and wherein said identifier identifies each of said translatable components;
  (b) an interface to a translator for translation of said identified translatable components from said source language to a selected destination language to generate corresponding translated components; and
  (c) an output module for generating a new translated file having substantially the same structure as said structured file and having said translated components in place of said translatable components.

13. The system of claim 12, wherein said identifier is a prefix, and wherein said prefix is a character string.

14. The system of claim 13, wherein said structured file is an XML file, and said parser comprises a SAX parser for searching for said identifiers which identify each translatable component.

15. The system of claim 12, further comprising an extraction module for extracting said identified translatable components into an isolated file for interfacing with said translation unit.

16. The system of claim 15, wherein said structured file, after extraction of said identified translatable components, comprises a skeleton file.

17. The system of claim 16, wherein said output module merges said skeleton file and said translated components in said isolated file.

18. The system of claim 12, wherein said parser is configured to parse a structure definition file corresponding to said structured file, said structure definition file containing identification information for said translatable components in said structured file.

19. The system of claim 18, wherein said structured file is an XML file, said structure definition file is an XML schema definition file, and said parser comprises a DOM parser.

20. The system of claim 19, wherein said translation module is configured to use said XML schema definition file and said DOM parser to identify said translatable components in said XML file, and to translate said translatable components in situ.

21. A computer readable medium for translating translatable components in a structured file, the computer readable medium comprising:
  (i) code for parsing said structured file to identify said translatable components and a source language, wherein said structured file includes an identifier prior to said parsing, and wherein said identifier identifies each of said translatable components;
  (ii) code for effecting translation of said identified translatable components from said source language to a selected destination language so as to generate corresponding translated components; and
  (iii) code for generating a new translated file having substantially the same structure as said structured file and having said translated components in place of said translatable components.

22. A system for translating components in a structured file, comprising:
  (a) means for parsing said structured file to identify said translatable components and a source language, wherein said structured file includes an identifier prior to said parsing, and wherein said identifier identifies each of said translatable components;
  (b) means for interfacing to a translator for translation of said identified translatable components from said source language to a selected destination language to generate corresponding translated components; and
  (c) means for generating a new translated file having substantially the same structure as said structured file and having said translated components in place of said translatable components.

* * * * *